US009235422B2

(12) United States Patent
Detter et al.

(10) Patent No.: US 9,235,422 B2
(45) Date of Patent: Jan. 12, 2016

(54) ELECTRONIC DEVICE MODE DETECTION

(71) Applicant: Google Technology Holdings, LLC, Mountain View, CA (US)

(72) Inventors: Craig J Detter, Gurnee, IL (US); Vel Pratheesh Sankar, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 380 days.

(21) Appl. No.: 13/802,122

(22) Filed: Mar. 13, 2013

(65) Prior Publication Data

US 2014/0281470 A1    Sep. 18, 2014

(51) Int. Cl.

| | |
|---|---|
| G06F 9/00 | (2006.01) |
| G06F 9/24 | (2006.01) |
| H04M 1/00 | (2006.01) |
| H04B 7/00 | (2006.01) |
| H04W 4/00 | (2009.01) |
| G06F 9/44 | (2006.01) |
| H04M 1/60 | (2006.01) |
| H04M 1/725 | (2006.01) |

(52) U.S. Cl.
CPC .............. *G06F 9/44* (2013.01); *H04M 1/6066* (2013.01); *H04M 1/6075* (2013.01); *H04M 1/72569* (2013.01); *G06F 9/4401* (2013.01); *H04M 1/6091* (2013.01); *H04M 1/7253* (2013.01); *H04M 2250/02* (2013.01); *H04M 2250/12* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 7,123,878 B1 | 10/2006 | Heinonen et al. | |
| 8,676,224 B2* | 3/2014 | Louch | 455/456.1 |
| 8,923,804 B1* | 12/2014 | Aldridge et al. | 455/404.2 |
| 2004/0160307 A1* | 8/2004 | Saikkonen et al. | 340/5.74 |
| 2005/0130593 A1* | 6/2005 | Michalak | 455/66.1 |
| 2009/0003620 A1* | 1/2009 | McKillop et al. | 381/80 |
| 2009/0094179 A1 | 4/2009 | Jager | |
| 2009/0253454 A1* | 10/2009 | Sampson | 455/550.1 |
| 2010/0317371 A1* | 12/2010 | Westerinen et al. | 455/456.6 |
| 2011/0028093 A1 | 2/2011 | Patel et al. | |
| 2012/0115453 A1* | 5/2012 | Zheng | 455/418 |
| 2013/0169878 A1* | 7/2013 | Kim et al. | 348/569 |
| 2014/0018058 A1* | 1/2014 | Dunko | 455/419 |
| 2015/0071090 A1* | 3/2015 | Mohammed et al. | 370/252 |

* cited by examiner

*Primary Examiner* — Ji H Bae

(74) *Attorney, Agent, or Firm* — Troutman Sanders, LLP; James E. Schutz; Christopher C. Close, Jr.

(57) ABSTRACT

In embodiments of electronic device mode detection, a mode detection application, implemented on an electronic device, correlates an identifier of a wireless device and an activity of the electronic device based at least in part on multiple instances of detecting the identifier of the wireless device during the activity of the electronic device. In some embodiments, the mode detection application correlates the identifier of the wireless device and the activity of the electronic device based at least in part on the identifier of the wireless device not being detected during one or more different activities of the electronic device. After correlating the identifier of the wireless device and the activity of the electronic device, the mode detection application configures the electronic device to automatically switch to a mode associated with the activity responsive to detecting the identifier of the wireless device.

16 Claims, 9 Drawing Sheets

ELECTRONIC DEVICE MODE DETECTION

BACKGROUND

A computing device may be able to determine whether a user of the computing device is performing certain activities, such as running or walking, based on signals received from sensors coupled to the computing device. The signals received from sensors are not always reliable, however, and can cause a computing device to incorrectly determine that the user is performing an activity. For example, signals received from the sensors may indicate that the user is running, when the user is actually in a business meeting.

BRIEF DESCRIPTION OF THE DRAWINGS

Embodiments of electronic device mode detection are described with reference to the following Figures. The same numbers may be used throughout to reference like features and components that are shown in the Figures.

DETAILED DESCRIPTION

In embodiments of electronic device mode detection, a mode detection application, implemented on an electronic device, correlates an identifier of a wireless device and an activity of the electronic device based at least in part on multiple instances of detecting the identifier of the wireless device during the activity of the electronic device. The electronic device can determine the activity of the electronic device based on sensor data, such as acceleration data or global positioning system (GPS) data, corresponding to the activity of the electronic device. In some embodiments, the mode detection application correlates the identifier of the wireless device and the activity of the electronic device based at least in part on the identifier of the wireless device not being detected during one or more different activities of the electronic device. After correlating the identifier of the wireless device and the activity of the electronic device, the mode detection application configures the electronic device to automatically switch to a mode associated with the activity responsive to detecting the identifier of the wireless device.

In other embodiments of electronic device mode detection, a mobile device detects a media access control device (MAC) address of a Bluetooth™ device. A mode detection application, implemented on the mobile device, determines whether the MAC address of the Bluetooth device is correlated with a driving mode. If the MAC address of the Bluetooth device is correlated with the driving mode, the mode detection application causes the mobile device to switch to the driving mode without regard to pairing with the Bluetooth device.

While features and concepts of electronic device mode detection can be implemented in any number of different devices, systems, and/or configurations, embodiments of electronic device mode detection are described in the context of the following example devices, systems, and methods.

Figure 1:
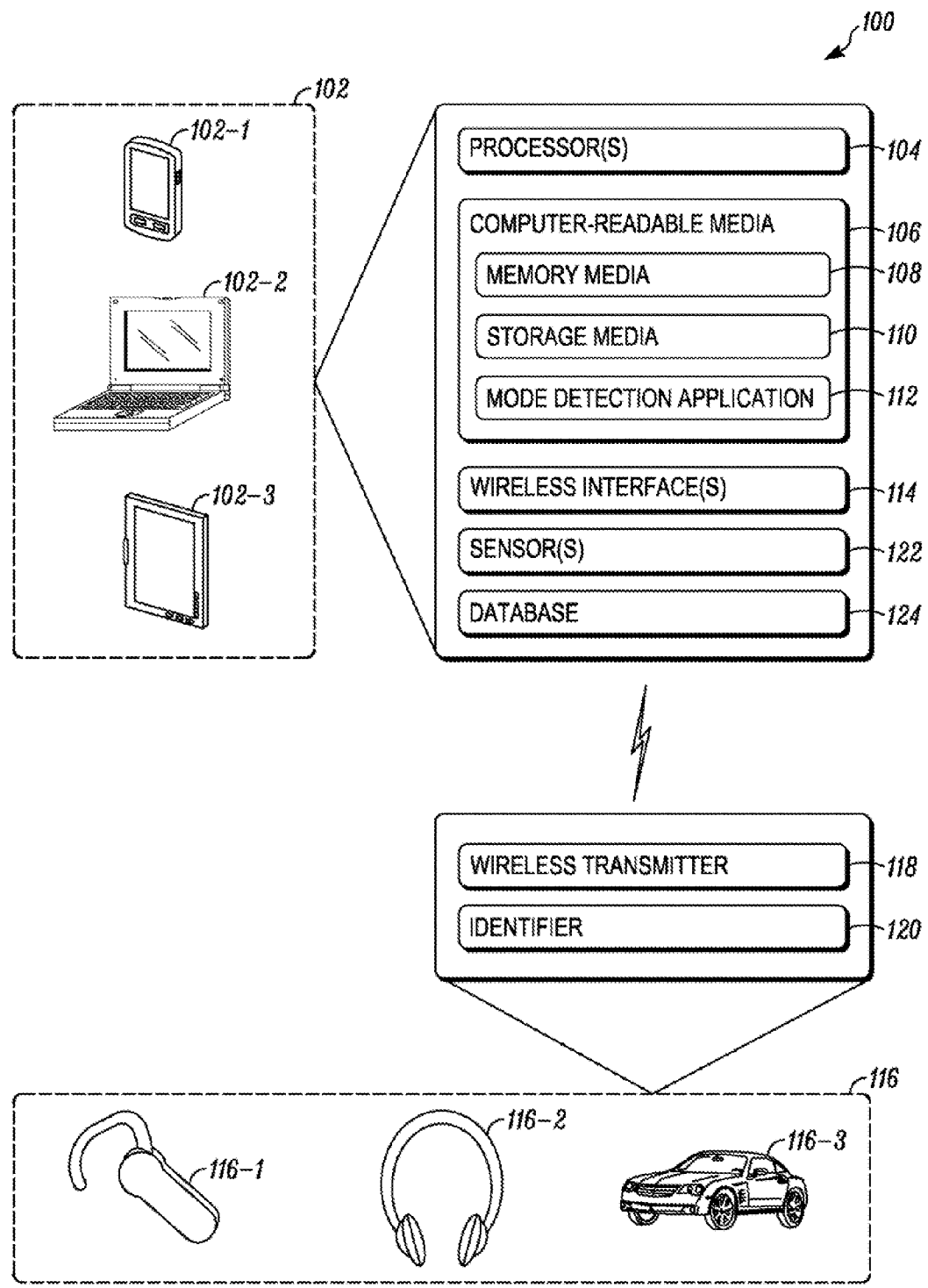
FIG. 1 illustrates an example system in which embodiments of electronic device mode detection can be implemented.

FIG. 1 is an illustration of an example environment 100 in which electronic device mode detection can be implemented. Environment 100 includes an electronic device 102, which is illustrated with various non-limiting example devices: mobile device 102-1, laptop 102-2, and tablet 102-3. Device 102 includes processor(s) 104 and computer-readable media 106, which includes memory media 108 and storage media 110. It is to be appreciated that electronic device 102 may also be implemented as an entertainment device, a gaming device, a navigation device, and/or other type of electronic device. Applications and/or an operating system (not shown) embodied as computer-readable instructions on computer-readable media 106 can be executed by processor(s) 104 to provide some or all of the functionalities described herein. Computer-readable media 106 also includes mode detection application 112, which will be described in more detail below. Electronic device 102 can also be implemented with any number and combination of differing components as further described with reference to the example device shown in FIG. 6.

Electronic device 102 may also include wireless interface(s) 114 for communicating data over wireless or optical networks. By way of example and not limitation, wireless interfaces 114 may communicate data over local-area-networks (LAN), wireless local-area-networks (WLAN), personal-area-networks (PAN), wide-area-networks (WAN), an intranet, the Internet, peer-to-peer networks, point-to-point networks, mesh networks, and the like.

Wireless interface 114 may also communicate data with wireless device(s) 116 located near electronic device 102. Wireless device(s) 116 may include a wireless transmitter 118 that is configured to transmit a signal that includes an identifier 120 of the wireless device that is detectable by wireless interface 114. In some embodiments, wireless device 116 can be implemented as a Bluetooth device, such as a Bluetooth headset 116-1, Bluetooth headphones 116-2, or Bluetooth car system 116-3, to name just a few. Bluetooth is a wireless technology standard for exchanging data over short distances between Bluetooth enabled devices. Each Bluetooth device has a unique identifier that is discoverable by scanning for Bluetooth devices. In accordance with various embodiments, when wireless device 116 is implemented as a Bluetooth device, identifier 120 may be a media access control (MAC) address of the Bluetooth device. While wireless device 116 will be described herein primarily as a Bluetooth device, it is to be noted that wireless device 116 may also be implemented as a WiFi™ device, such as a WiFi hotspot in a car, or as any other type of discoverable wireless device.

Environment 100 may also include one or more sensors 122 that are configured to receive sensor data corresponding to an activity of electronic device 102. Sensors 122 can be implemented as an accelerometer sensor configured to receive accelerometer data, a global positioning system (GPS) sensor configured to receive GPS data, or any other type of sensor configured to receive sensor data that corresponds to an activity of electronic device 102. As described herein, activities of the electronic device can correspond to activities of a user of electronic device 102, such as the user driving in a car, running, walking, or sleeping.

Sensors 122 can determine activities of electronic device 102 in a variety of different ways. An accelerometer sensor, for example, can determine that the user is driving in car, running, or walking by sensing motion patterns of electronic device 102 that correspond to these activities. For instance, when the user is running with electronic device 102, the motion pattern of the electronic device may move down, forward, and then up in a triangular pattern. Similarly, when a user is driving with electronic device 102, the motion pattern of the electronic device may be a constant forward motion that also goes up and down. The accelerometer sensor is configured to sense motion patterns and determine an activity of electronic device 102 based on the sensed motion patterns. Additionally, a GPS sensor can determine speed and/or acceleration of the electronic device by determining changes in a location of the electronic device over time. In some cases, an activity of the electronic device can be determined using both accelerometer data and GPS data. For example, a triangular motion pattern sensed by the accelerometer sensor can be determined to correspond to driving, instead of running, if GPS data indicates a speed of 50 mph.

Mode detection application 112 can cause electronic device 102 to automatically switch to a mode associated with a detected activity to enable the user to more effectively use the electronic device when performing the activity. As discussed in more detail below, modes associated with the activity of the electronic device can include, by way of example and not limitation, a driving mode, a running mode, a walking mode, and a sleeping mode.

Unfortunately, detection of activities of electronic device 102 by sensors 122 can be inconsistent and unreliable. Acceleration sensors, for example, may detect that a user is driving, when in fact the user is actually in a meeting. The triangular pattern of acceleration data that indicates the electronic device moving forward, then down, then up can be detected by sensors 122 if the user moves the electronic device in this pattern. It is to be appreciated that if the mobile device switches to a driving mode when the user is not driving that this could be annoying and inconvenient for the user. For example, it would be annoying to the user to have the user's mobile device switch into the driving mode and announce the name of incoming callers if the user is actually in a meeting. As another example, accelerometer sensors may determine that the user is not driving, causing the user's mobile device to switch out of the driving mode, when the user is stopped at a red light or stuck in traffic. GPS sensors can also be unreliable in areas where a weak GPS signal is detected. For example, GPS sensors may determine that a user is moving at a speed of 50 mph, when in fact the user is walking along a window of a tall building which may cause the GPS signal to be weak.

In accordance with various embodiments, mode detection application 112 is configured to correlate identifier 120 of wireless device 116 with an activity of electronic device 102 based at least in part on multiple instances of detecting identifier 120 of wireless device 116 during the activity of electronic device 102. To correlate an identifier of a wireless device with an activity, electronic device 102 controls wireless interface 114 to scan for and detect identifiers of wireless devices responsive to receiving sensor data from sensors 122 that indicate that the activity is occurring. Then, over a period of time, mode detection application 112 is able to determine identifiers 120 of wireless devices 116 that are consistently detected during certain activities. For example, if a user drives a car with a Bluetooth car system, such as Bluetooth car system 116-3, mode detection application 112 can determine, over a period of time, that when a driving activity is occurring, an identifier of the Bluetooth car system is often detected.

Once an identifier 120 of a wireless device 116 is consistently detected during an activity, mode detection application 112 correlates the identifier of the wireless device with the activity.

In various embodiments, each time that identifier 120 of wireless device 116 is detected during an activity, mode detection application 112 updates a detection count associated with the identifier of the wireless device and the activity of the electronic device in a database 124. The detection count, therefore, indicates the total number of times, or instances, that the identifier of the wireless device has been detected during the activity. Database 124 is configured to store associations between identifiers 120 of wireless devices 116 and activities of electronic device 102. Database 124 can be located at electronic device 102, or can be located at a remote server or computing device, accessible by electronic device 102 over a mobile network or a wireless network via wireless interface 114.

FIGS. 2A through 2G illustrate examples of database 124 that associates identifiers 120 of wireless devices 116 with activities of electronic device 102, in accordance with some embodiments. In these examples, database 124 includes a device identifier field 202, an activity field 204, a detection count field 206, and a correlation field 208. It is to be appreciated, however, that this is a non-limiting example of database 124, and that database 124 can include any type of data fields that associate identifiers 120 of wireless devices 116 and activities.

Figure 2A:
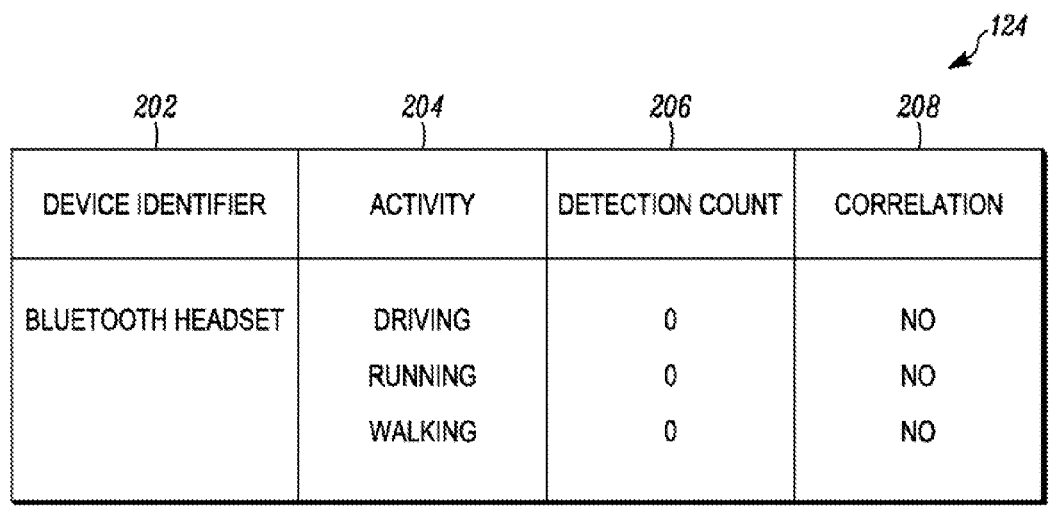
FIGS. 2A through 2G illustrate examples of a database that associates wireless devices with activities of an electronic device in accordance with one or more embodiments of electronic device mode detection.

Mode detection application 112 can be implemented to create a new entry in database 124 for an identifier of a wireless device the first time that mode detection application 112 detects the identifier during the activity. In FIG. 2A, for example, mode detection application 112 creates a new entry corresponding to a detected Bluetooth headset, such as Bluetooth headset 116-1, the first time that the Bluetooth headset is detected during an activity. Consider, for example, that sensor 122 receives sensor data that corresponds to driving in a car. In response, mode detection application 112 controls wireless interface 114 to scan for identifiers 120 of wireless devices 116. In this example, wireless interface 114 detects an identifier of the Bluetooth headset. If this is the first time that the identifier of the Bluetooth headset is detected, mode detection application 112 creates a new entry for the Bluetooth headset by storing an identifier of the Bluetooth headset in device identifier field 202. Mode detection application 112 is configured to store any type of identifier of a wireless device in database 124, including a name of the identifier, or a MAC address of the wireless device, to name just a few.

Figure 2B:
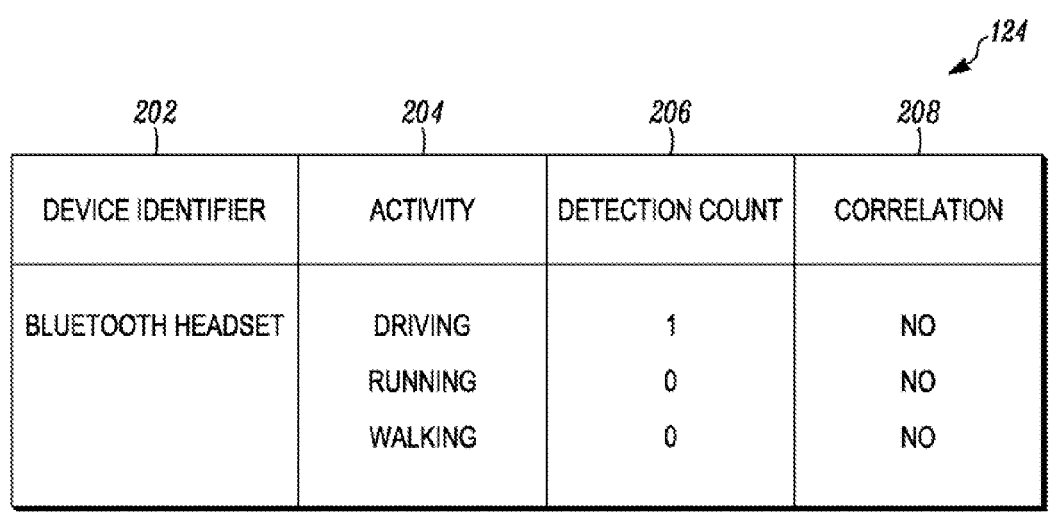

After creating the new entry in database 124, mode detection application 112 associates the identifier of the wireless device with the activity. In some embodiments, mode detection application 112 associates the identifier of the wireless device with the activity by updating detection count field 206. For example, as illustrated in FIG. 2B, after creating the new entry for the Bluetooth headset in database 124, mode detection application updates detection count field 206 associated with the driving activity to "1" to indicate the detection of the Bluetooth headset during the driving activity.

Figure 2C:
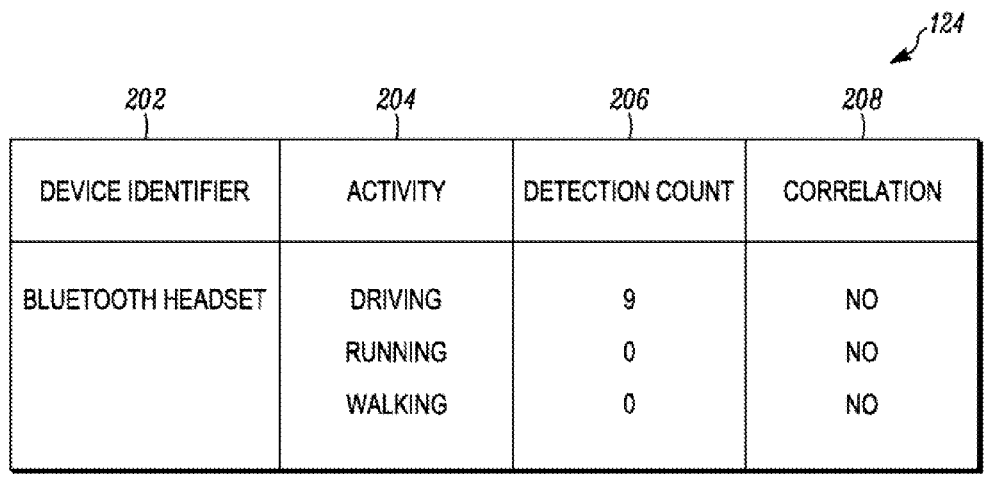
Figure 2D:
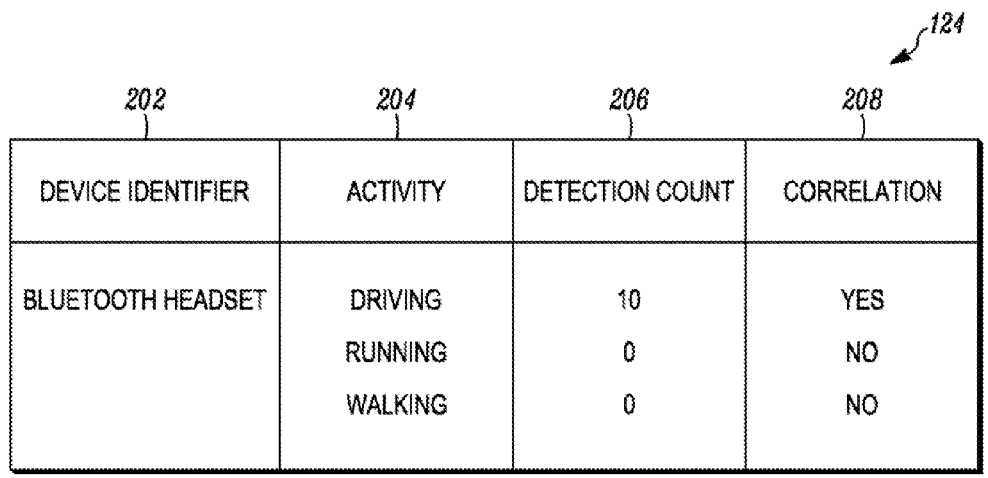

In some embodiments, mode detection application 112 is configured to correlate an identifier of a wireless device and an activity when the detection count associated with the identifier of the wireless device and the activity is greater than, or equal to, a predetermined threshold. In FIG. 2C, for example, consider that the predetermined threshold is 10 previous detections. In this example, detection count field 206 of database 124 indicates that the Bluetooth headset has been detected during the driving activity 9 times, but is not yet correlated with the driving activity. Therefore, the next time that wireless interface 114 detects the identifier of the Bluetooth headset during the driving activity, mode detection application 112 updates detection count field 206 associated with the Bluetooth headset and driving to "10", as illustrated in FIG. 2D. In addition, because the detection count is now equal to the predetermined threshold, mode detection application 112 updates correlation field 208 associated with driving to "yes", as illustrated in FIG. 2D. It is to be appreciated that the predetermined threshold of detections can be set to any number. In some embodiments, for example, mode detection application 112 correlates a wireless device and an activity if the identifier of the wireless device is detected during the activity two or more times. Alternately, the predetermined threshold may correspond to a frequency of detections over a predetermined period of time. For example, mode detection application 112 can be configured to correlate an identifier with an activity if the identifier is detected during the activity 10 times over a period of one week, but not if it is detected 10 times over a period of 1 year.

In some embodiments, mode detection application 112 is configured to correlate an identifier of a wireless device with an activity if the identifier of the wireless device is not detected during one or more different activities of the electronic device. In other words, mode detection application 112 does not correlate an identifier and an activity if the identifier has also been previously detected during one or more other activities. It is to be appreciated, that if the identifier has been detected during two or more different activities, that that mode detection application 112 cannot rely on detection of the identifier as an indicator of a single activity.

Figure 2E:
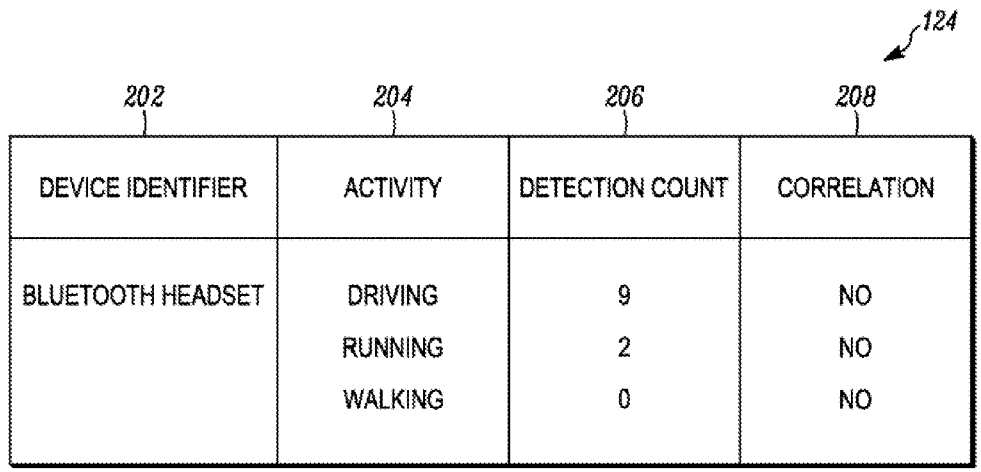
Figure 2F:
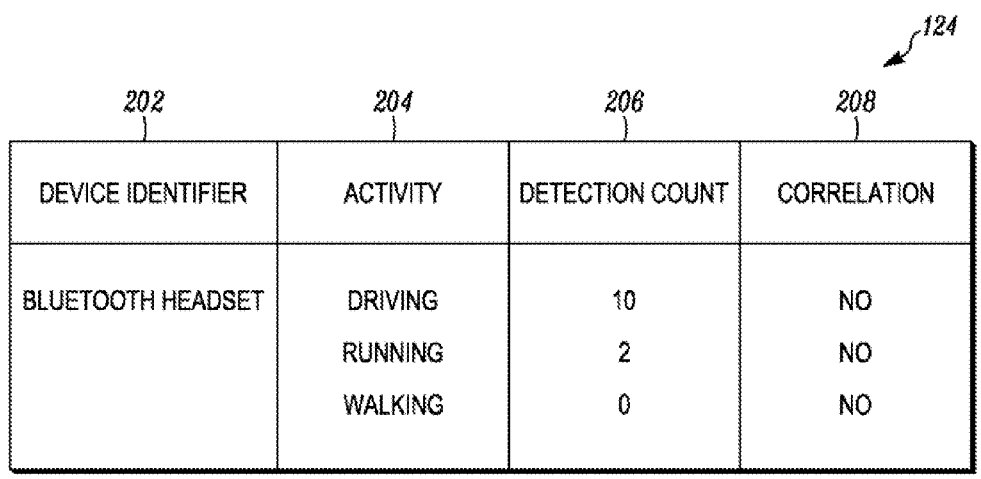

In FIG. 2E, for example, consider that the predetermined threshold is again 10 previous detections. In this example, activity field 204 of database 124 indicates that the identifier of the Bluetooth headset has been detected during the driving activity 9 different times, but is not correlated with the driving activity. In this case, however, detection count 206 of database 124 indicates that the Bluetooth headset has also been detected during a running activity 2 different times. In this case, because the identifier of the Bluetooth headset has been detected during both driving activities and running activities, the detection of the identifier of the Bluetooth headset, by itself, does not enable mode detection application 112 to determine that the user is either driving or running. Thus, as illustrated in FIG. 2F, when wireless interface 114 again detects the identifier of the Bluetooth headset during the driving activity, mode detection application 112 updates detection count field 206 associated with the Bluetooth headset and driving to "10" previous detections. Mode detection application 112 does not, however, change correlations field 208 associated with the Bluetooth headset and driving to "yes", even though the number of previous detections is equal to the predetermined threshold, because the Bluetooth headset has also been detected during the running activity.

In some embodiments, mode detection application 112 is configured to remove a correlation of an identifier of a wireless device and an activity if the identifier is detected during a different activity. In FIG. 2D, for example, mode detection application 112 can remove the correlation between the Bluetooth headset and driving by changing verification field 208 associated with driving to "no" if the identifier of the Bluetooth headset is detected during a different activity, such as running. Alternately, mode detection application 112 can remove the correlation between the Bluetooth headset and driving by deleting the data corresponding to the Bluetooth headset in database 124 if the identifier of the Bluetooth headset is detected during a different activity, such as running.

Figure 2G:
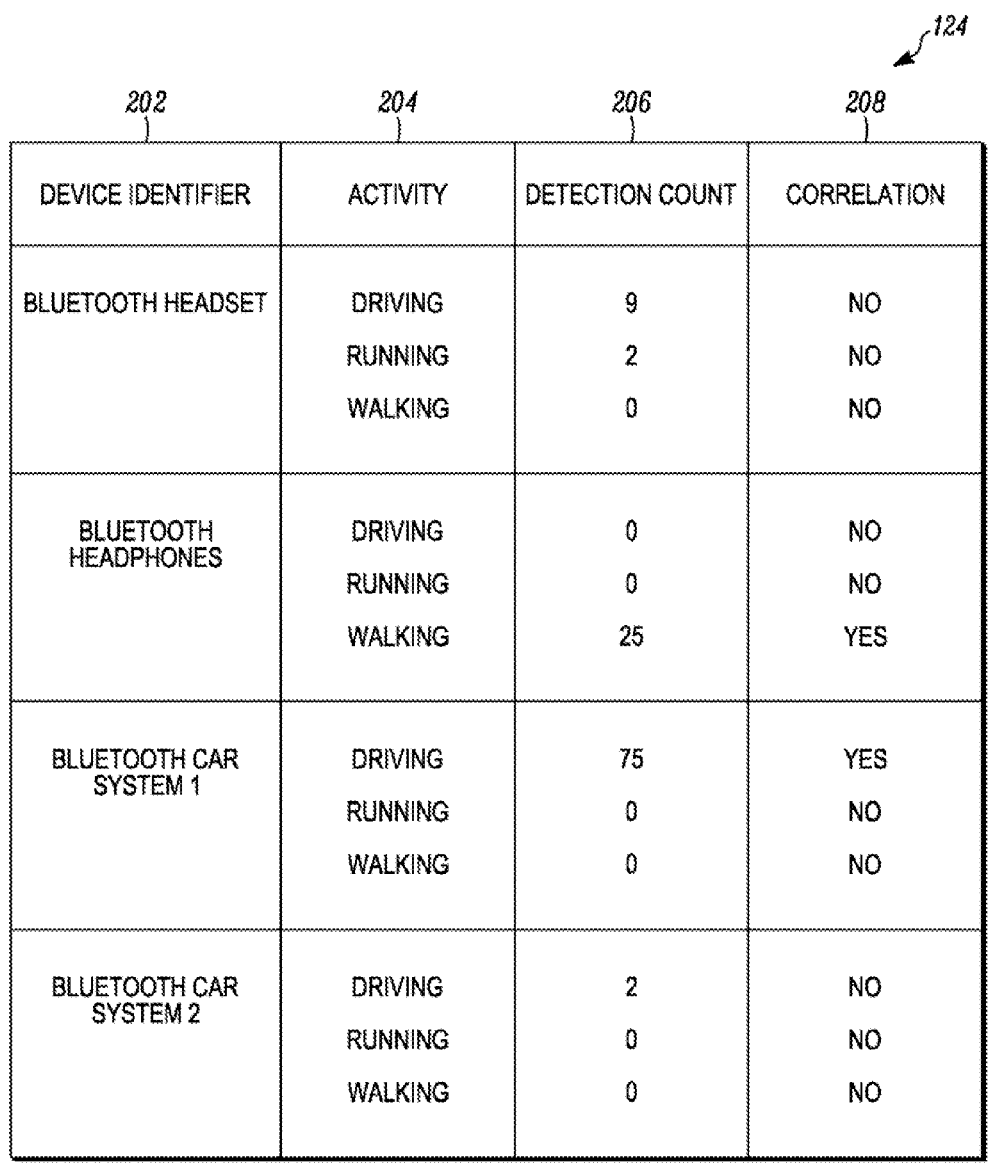

FIG. 2G illustrates an example database 124 that includes entries for a Bluetooth Headset, Bluetooth headphones, a first Bluetooth car system, and a second Bluetooth car system. In this example, the Bluetooth headset is not correlated with any activities because an identifier of the Bluetooth headset has been detected during both driving activities and running activities. In contrast, the Bluetooth headphones are correlated with running, in this example, because an identifier of the Bluetooth headphones has been detected during the running activity 25 times, and has not been detected during any other activities. Similarly, the first Bluetooth car system is correlated with driving because an identifier of the Bluetooth car system has been detected during the driving activity 75 times, and has not been detected during any other activities. In contrast, the second Bluetooth car system is not correlated with driving because an identifier of the second Bluetooth car system has only been detected 2 times during the driving activity. Consider, for example, that the first Bluetooth car system may correspond to the user's car, whereas the second Bluetooth car system could correspond to a car of the user's friend that the user rides in less frequently. In some embodiments, mode detection application 112 is configured to correlate a single wireless device 116 with each activity. In FIG. 2G, for example, even if there were 25 detections of the second Bluetooth headset during the driving activity, mode detection application 112 can be implemented to correlate only the first Bluetooth headset with driving because this association has been detected more times.

In some embodiments, mode detection application 112 is configured to initiate display of contents of database 124 on a screen of electronic device 102 to enable the user to correlate, or un-correlate, an identifier 120 of a wireless device 116 and an activity. For example, mode detection application 112 may automatically remove a correlation between a wireless device and an activity if an identifier of the wireless device is detected during a different activity. Mode detection application 112, however, can enable the user to override the removal of the correlation by selecting a control to correlate the wireless device and the activity.

After correlating an identifier of a wireless device with an activity, mode detection application 112 configures electronic device 102 to automatically switch to a mode associated with the activity responsive to detecting the identifier of the wireless device at a subsequent time. In FIG. 2D, for example, mode detection application 112 causes electronic device 102 to automatically switch to the driving mode when the identifier of the Bluetooth device is detected based on the correlation of the identifier of the Bluetooth device and driving in correlation field 208 of database 124. It is to be appreciated that the detection of an identifier of a wireless device to determine that an activity is occurring is more reliable than detecting an activity based on accelerometer data received from an accelerometer sensor, or GPS data received from a GPS sensor. Thus, once an identifier of a wireless device and an activity are correlated, mode detection application 112 can accurately determine when to cause electronic device 102 to switch to a mode associated with the activity based on detection of the identifier.

Modes associated with activities of electronic device 102, can include, by way of example and not limitation, a driving mode, a running mode, a walking mode, and a sleeping mode. A driving mode of electronic device 102 activates features that enable the user to interact with the electronic device when driving or riding in a car. For example, a mobile device, when in the driving mode, can be controlled to announce a name of a caller, or to receive voice commands from the user to control the mobile device. In some embodiments, the driving mode may cause electronic device 102 to notify other devices that the user is driving. For example, electronic device 102 may determine that the user is driving home from work, and responsively send a notification to a heating system located at the user's house that causes the heating system to switch from an economy setting to a comfort setting. In some embodiments, electronic device 102 can automatically update a status of the user on one or more social media sites to indicate that the user is currently driving, sleeping, or going for a run. As another example, a running mode may enable a user to control electronic device 102 when running, such as by enabling the user to select and play songs on electronic device 102 using voice commands.

It is to be noted that mode detection application 112 can detect identifier 120 of wireless device 116 and cause electronic device 102 to automatically switch to a mode associated with a corresponding activity, without regard to connecting to, or pairing with, the wireless device. Consider, for example, a car equipped with a Bluetooth car system, such as Bluetooth car system 116-3, that enables a user to pair the user's mobile device to the Bluetooth car system to place and receive calls through the Bluetooth car system. A user of the car, however, may prefer to not connect the user's mobile device to Bluetooth car system 116-3 when driving. Nevertheless, each time the user is in the user's car, mode detection application 112 executing on the user's mobile device is able to detect a wireless signal from the Bluetooth car system that includes an identifier 120 of the Bluetooth car system. Therefore, detection of the identifier of Bluetooth car system causes mode detection application 112 to switch the user's mobile device to the driving mode even though the user does not pair the mobile device to the Bluetooth car system.

EXAMPLE METHODS

Example methods 300, 400, and 500 are described with reference to FIG. 1 in accordance with one or more embodiments of electronic device mode detection. Generally, any of the methods, components, and modules described herein can be implemented using software, firmware, hardware (e.g., fixed logic circuitry), manual processing, or any combination thereof. A software implementation represents program code that performs specified tasks when executed by a computer processor, and the program code can be stored in computer-readable storage media devices.

Figure 3:
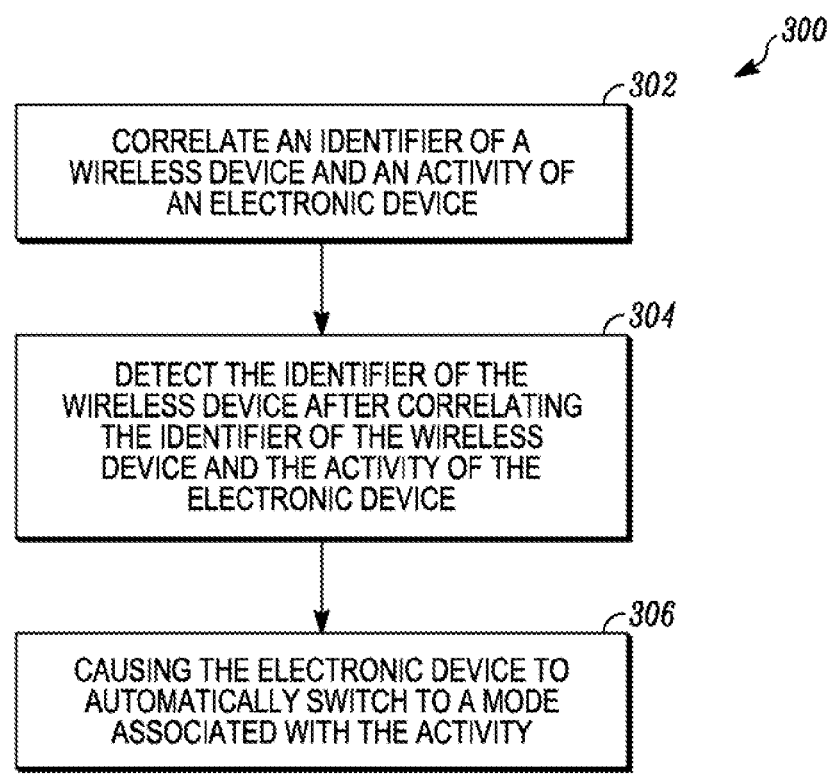
FIG. 3 illustrates example method(s) of electronic device mode detection in accordance with one or more embodiments.

FIG. 3 illustrates example method(s) 300 of electronic device mode detection. The order in which the method blocks are described are not intended to be construed as a limitation, and any number or combination of the described method blocks can be combined in any order to implement a method, or an alternate method.

Block 302 correlates an identifier of a wireless device and an activity of an electronic device. For example, mode detection application 112 (FIG. 1) correlates identifier 120 of wireless device 116 with an activity of electronic device 102 based at least in part on multiple instances of detecting the identifier of the wireless device during the activity of the electronic device. In some embodiments, mode detection application 112 is further configured to correlate identifier 120 of wireless device 116 with the activity of electronic device 102 based on the identifier not being detected during one or more different activities of the electronic device. An activity of electronic device 102 can include, by way of example and not limitation, driving, running, or walking. The activity can be determined by mode detection application 112 based on sensor data, received from sensors 122, that corresponds to the activity. In some embodiments, wireless device 116 is a Bluetooth device, such as Bluetooth headset 116-1, Bluetooth headphones 116-2, or Bluetooth car system 116-3, and the identifier is a MAC address of the Bluetooth device.

Block 304 detects the identifier of the wireless device after correlating the identifier of the wireless device and the activity of the electronic device. For example, wireless interface 114 detects identifier 120 of wireless device 116 after mode detection application 112 correlates the identifier of the wireless device and the activity of the electronic device.

Block 306 causes the electronic device to automatically switch to a mode associated with the activity. For example, mode detection application 112 causes electronic device 102 to automatically switch to a mode associated with the activity. Modes associated with an activity can include, by way of example and not limitation, a driving mode, a running mode, a walking mode, or a sleeping mode.

Figure 4:
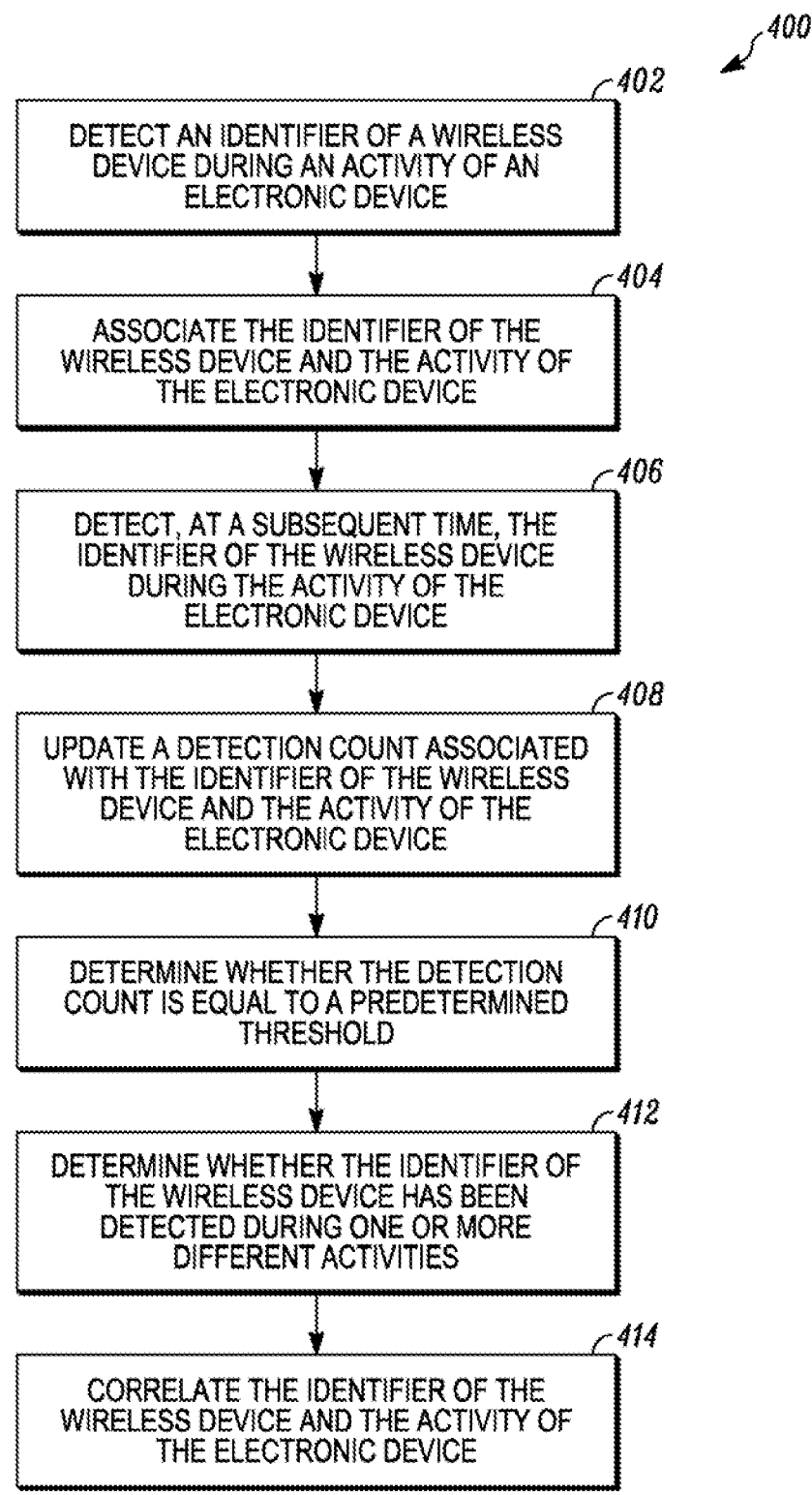
FIG. 4 illustrates additional example method(s) of electronic device mode detection in accordance with one or more embodiments.

FIG. 4 illustrates additional example method(s) 400 of electronic device mode detection. In particular, FIG. 4 illustrates a more-detailed method of correlating an identifier of a wireless device and an activity of an electronic device, as illustrated in block 302 of FIG. 3. The order in which the method blocks are described are not intended to be construed as a limitation, and any number or combination of the described method blocks can be combined in any order to implement a method, or an alternate method.

Block 402 detects an identifier of a wireless device during an activity of an electronic device. For example, wireless interface 114 (FIG. 1) detects identifier 120 of wireless device 116 during an activity of electronic device 102.

Block 404 associates the identifier of the wireless device and the activity of the electronic device. For example, as illustrated in FIGS. 2A through 2G, the first time that identifier 120 of wireless device 116 is detected during the activity, mode detection application 112 associates identifier 120 of wireless device 116 and the activity of electronic device 102 in database 124.

Block 406 detects, at a subsequent time, the identifier of the wireless device during the activity of the electronic device, and block 408 updates a detection count associated with the identifier of the wireless device and the activity of the electronic device. For example, wireless interface 114 detects, at a subsequent time, identifier 120 of wireless device 116 during the activity of electronic device 102. When the identifier of the wireless device is subsequently detected, mode detection application 112 updates the detection count associated with identifier 120 of wireless device 116 and the activity in database 124. The detection count, therefore, indicates the total number of times, or instances, that the identifier of the wireless device has been detected during the activity.

Block 410 determines whether the detection count is equal to a predetermined threshold. For example, mode detection application 112 determines whether the detection count associated with identifier 120 of wireless device 116 and the activity of electronic device 102 in database 124 is equal to a predetermined threshold. If the detection count is not equal to the predetermined threshold, mode detection application 112 continues to update the detection count each time that the identifier of the wireless device is detected.

Block 412 determines whether the identifier of the wireless device has been detected during one or more different activities. For example, mode detection application 112 determines whether identifier 120 of wireless device 116 has been detected during one or more different activities of electronic device 102. In some embodiments, if the identifier of the wireless device has been detected during one or more different activities, then mode detection application 112 does not correlate the identifier of the wireless device with either of the two or more activities.

Block 414 correlates the identifier of the wireless device and the activity of the electronic device. For example, mode detection application 112 correlates identifier 120 of wireless device 116 and the activity of electronic device 102 in database 124. In some embodiments, mode detection application 112 correlates identifier 120 of wireless device 116 and the activity of electronic device 102 in database 124 if the detection count is equal to the predetermined threshold. In some embodiments, mode detection application 112 correlates identifier 120 of wireless device 116 and the activity of electronic device 102 in database 124 if the identifier of the wireless device has not been detected during one or more different activities. In some embodiments, mode detection application 112 correlates identifier 120 of wireless device 116 and the activity of electronic device 102 in database 124 if the detection count is equal to the predetermined threshold and if the identifier of the wireless device has not been detected during one or more different activities.

Figure 5:
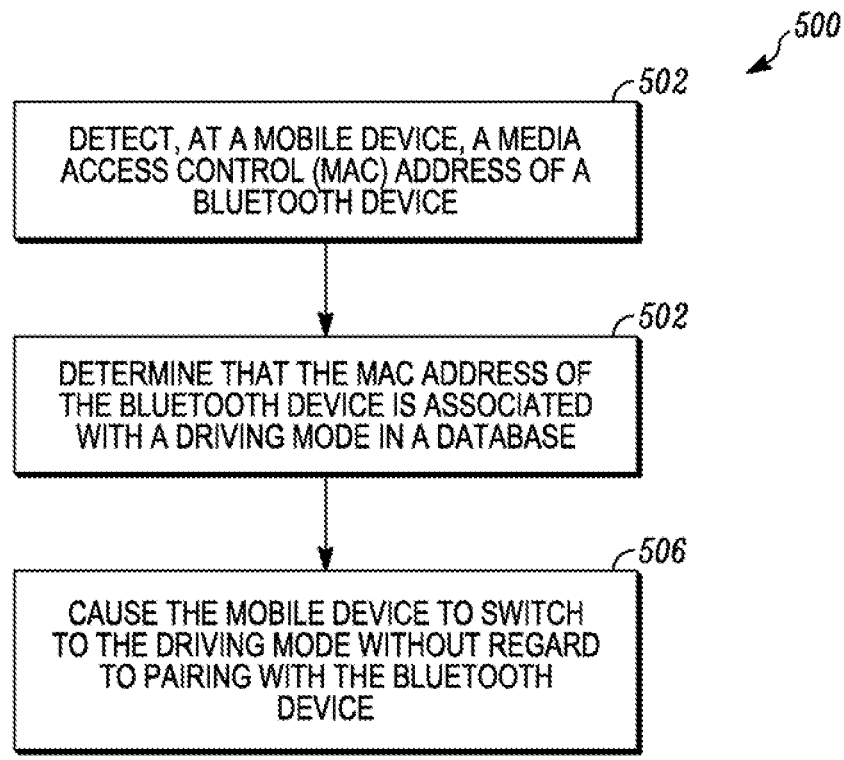
FIG. 5 illustrates additional example method(s) of electronic device mode detection in accordance with one or more embodiments.

FIG. 5 illustrates additional example method(s) 500 of electronic device mode detection. The order in which the method blocks are described are not intended to be construed as a limitation, and any number or combination of the described method blocks can be combined in any order to implement a method, or an alternate method.

Block 502 detects, at a mobile device, a MAC address of a Bluetooth device. For example, wireless interface 114 (FIG. 1) of mobile device 102-1 detects a MAC address of a Bluetooth device, such as Bluetooth headset 116-1, Bluetooth headphones 116-2, or Bluetooth car system 116-3.

Block 504 determines that the MAC address of the Bluetooth device is associated with a driving mode in a database. For example, mode detection application 112 determines that the MAC address of the Bluetooth device is associated with a driving mode in database 124.

Block 506 causes the mobile device to switch to the driving mode without regard to pairing with the Bluetooth device. For example, mode detection application 112 causes mobile device 102-1 to switch to the driving mode without regard to pairing with the Bluetooth device. In various embodiments, the driving mode causes the mobile device to announce incoming callers via a speaker of the mobile device, update a status associated with the user of the mobile device, and/or enable the mobile device to receive voice commands from a user of the mobile device.

Figure 6:
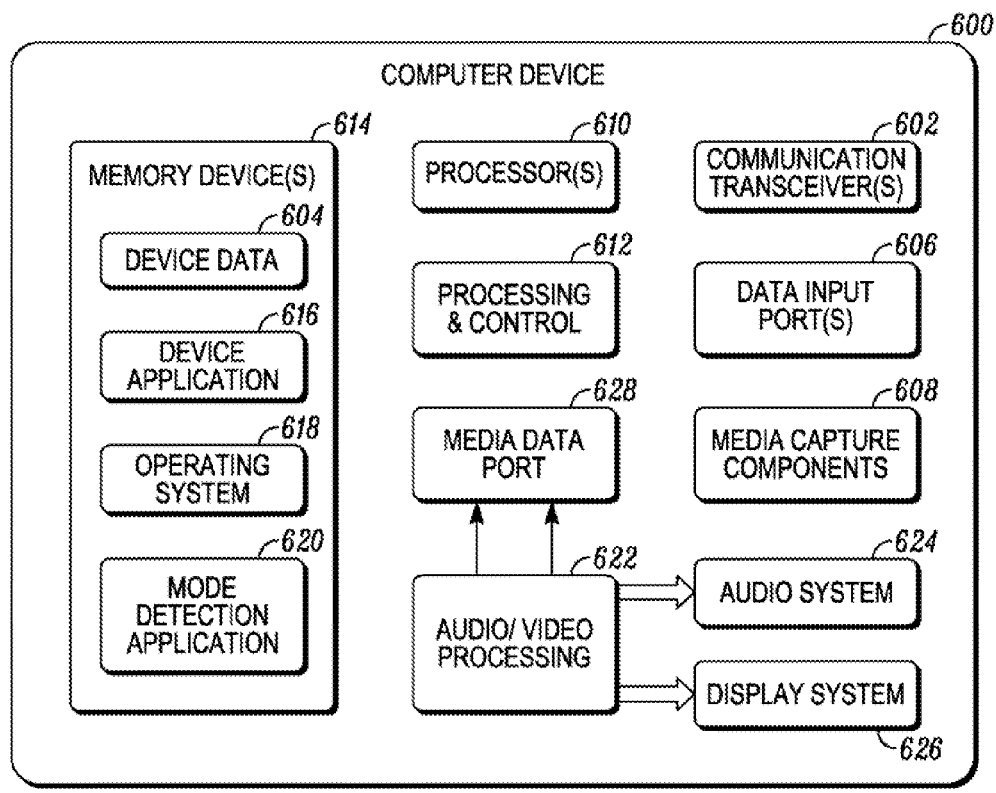
FIG. 6 illustrates various components of an example computer device that can implement embodiments of electronic device mode detection.

FIG. 6 illustrates various components of an example computer device 500 that can be implemented as any device described with reference to any of the previous FIGS. 1-5, such as electronic device 102 or wireless device 116. The computer device may be implemented as any one or combination of a fixed or mobile device, in any form of a consumer, computer, portable, user, communication, phone, navigation, gaming, media playback, and/or computer device.

The computer device 600 includes communication transceivers 602 that enable wired and/or wireless communication of device data 604, such as received data, data that is being received, data scheduled for broadcast, data packets of the data, etc. Example communication transceivers 602 include wireless personal area network (WPAN) radios compliant with various IEEE 802.15 (also referred to as Bluetooth™) standards, wireless local area network (WLAN) radios compliant with any of the various IEEE 802.11 (also referred to as WiFi™) standards, wireless wide area network (WWAN) radios for cellular telephony, wireless metropolitan area network (WMAN) radios compliant with various IEEE 802.15 (also referred to as WiMAX™) standards, and wired local area network (LAN) Ethernet transceivers.

The computer device 600 may also include one or more data input ports 606 via which any type of data, media content, and/or inputs can be received, such as user-selectable inputs, messages, music, television content, recorded video content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the computer device to components, peripherals, or accessories such as microphones or cameras. Additionally, the computer device 600 may include media capture components 608, such as an integrated microphone to capture audio and a camera to capture still images and/or video media content.

The computer device 600 includes one or more processors 610 (e.g., any of microprocessors, controllers, and the like), which process computer-executable instructions to control operation of the device. Alternatively or in addition, the computer device can be implemented with any one or combination of software, hardware, firmware, or fixed logic circuitry that is implemented in connection with processing and control circuits, which are generally identified at 612. Although not shown, the computer device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computer device 600 also includes one or more memory devices 614 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The computer device 600 may also include a mass storage media device.

A memory device 614 provides data storage mechanisms to store the device data 604, other types of information and/or data, and various device applications 616 (e.g., software applications). For example, an operating system 618 can be maintained as software instructions within a memory device and executed on the processors 610. The device applications may also include a device manager, such as any form of a control application, software application, signal-processing and control module, code that is native to a particular device, a hardware abstraction layer for a particular device, and so on. In embodiments, the computer device also includes mode detection application 620. Mode detection application 620 is an example of the mode detection application 112 at the electronic device 102 shown in FIG. 1.

The computer device 600 also includes an audio and/or video processing system 622 that generates audio data for an audio system 624 and/or generates display data for a display system 626. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 628. Additionally, the audio system and/or the display system may be external components to the computer device, or alternatively, are integrated components of the example computer device.

Although embodiments of electronic device mode detection have been described in language specific to features and/or methods, the subject of the appended claims is not necessarily limited to the specific features or methods described. Rather, the specific features and methods are disclosed as example implementations of electronic device mode detection.

The invention claimed is:

1. A method, comprising:
   detecting, at an electronic device, an identifier of a wireless device during an activity of the electronic device;
   associating the identifier of the wireless device and the activity of the electronic device in a database;
   detecting, at one or more subsequent times, the identifier of the wireless device during the activity of the electronic device;
   updating a detection count associated with the identifier of the wireless device and the activity of the electronic device in the database each of the one or more subsequent times the identifier of the of the wireless is detected during the activity of the electronic device;
   responsive to the detection count equaling a predetermined threshold, correlating, at the electronic device, the identifier of the wireless device and the activity of the electronic device based at least in part on multiple instances of detecting the identifier of the wireless device during the activity of the electronic device; and
   responsive to detecting the identifier of the wireless device after correlating the identifier of the wireless device and the activity of the electronic device, causing the electronic device to automatically switch to a mode associated with the activity.

2. The method as recited in claim 1, further comprising detecting, at the electronic device, the identifier of the wireless device during a different activity of the electronic device; and
   removing the correlation of the identifier of the wireless device and the activity of the electronic device.

3. The method as recited in claim 1, wherein the activity of the electronic device is determined based on sensor data corresponding to the activity of the electronic device.

4. The method as recited in claim 3, wherein the sensor data comprises at least one of:
   accelerometer data received from an accelerometer sensor of the electronic device, or
   global positioning system (GPS) data received from a GPS sensor of the electronic device.

5. The method as recited in claim 1, wherein the activity comprises driving, and wherein the mode comprises a driving mode.

6. The method as recited in claim 1, wherein the causing further comprises causing the electronic device to automatically switch to the mode associated with the activity without regard to connecting to the wireless device.

7. The method as recited in claim 1, wherein the wireless device comprises a personal area network device, and wherein the identifier comprises a personal area network media access control (MAC) address of the personal area network device.

8. An electronic device, comprising:
   a sensor configured to receive sensor data corresponding to an activity of the electronic device;
   a wireless interface configured to detect an identifier of a wireless device;
   a processor; and
   a non-transitory storage medium storing a mode detection application that, when executed by the processor, causes the electronic device to:
      detect an identifier of a wireless device during an activity of the electronic device;
      associate the identifier of the wireless device and the activity of the electronic device in a database;
      detect, at one or more subsequent times, the identifier of the wireless device during the activity of the electronic device;
      update a detection count associated with the identifier of the wireless device and the activity of the electronic device in the database each of the one or more subsequent times the identifier of the of the wireless is detected during the activity of the electronic device;
      responsive to the detection count equaling a predetermined threshold, correlate the identifier of the wireless device and the activity of the electronic device based at least in part on multiple instances of the wireless interface detecting the identifier of the wireless device during the activity of the electronic device; and
      configure the electronic device to automatically switch to a mode associated with the activity responsive to detecting the identifier of the wireless device at a subsequent time.

9. The electronic device as recited in claim 8, wherein the mode detection application, when executed by the processor, further causes the electronic device to correlate the identifier of the wireless device and the activity of the electronic device based at least in part on the identifier of the wireless device not being detected by the wireless interface during one or more different activities of the electronic device.

10. The electronic device as recited in claim 8, wherein the activity comprises driving, and wherein the mode comprises a driving mode.

11. The electronic device as recited in claim 8, wherein the wireless device comprises a personal area network device, and wherein the identifier comprises a personal area network media access control (MAC) address of the personal area network device.

12. The electronic device as recited in claim 8, wherein the personal area network device comprises a personal area network headset, personal area network headphones, or a personal area network car dock.

13. A method comprising:
   detecting, at a mobile device, a media access control (MAC) address of a personal area network device during a driving activity of the mobile device;
   associating the MAC address of the personal area network device and the driving activity of the mobile device in a database;
   detecting, at one or more subsequent times, the MAC address of the personal network area device during the driving activity of the mobile device;
   updating a detection count associated with the MAC address of the personal network area device and the driving activity of the mobile device in the database each of the one or more subsequent times the MAC address of the personal network area device is detected during the driving activity of the mobile device;

responsive to the detection count equaling a predetermined threshold, correlating the MAC address of the personal area network device with a driving mode; and responsive to detecting the MAC address of the personal area network device, causing the mobile device to switch to the driving mode without regard to pairing the mobile device with the personal area network device.

14. The method as recited in claim 13, wherein the driving mode causes the mobile device to announce incoming callers via a speaker of the mobile device.

15. The method as recited in claim 13, wherein the driving mode updates a status associated with a user of the mobile device.

16. The method as recited in claim 13, wherein the driving mode enables the mobile device to receive voice commands from a user of the mobile device.

* * * * *